United States Patent
Iizuka

[11] Patent Number: 5,764,399
[45] Date of Patent: Jun. 9, 1998

[54] SCANNING LENS

[75] Inventor: Takashi Iizuka, Tokyo, Japan

[73] Assignee: Asahi Kogaku Kogyo Kabushiki Kaisha, Tokyo, Japan

[21] Appl. No.: 675,871

[22] Filed: Jul. 5, 1996

[30] Foreign Application Priority Data

Jul. 7, 1995 [JP] Japan .................. 7-196000

[51] Int. Cl.$^6$ .................. G02B 26/08
[52] U.S. Cl. .................. 359/205; 359/206; 359/207; 359/662; 347/258
[58] Field of Search .................. 359/205, 206, 359/207, 662, 782; 347/258, 259

[56] References Cited

U.S. PATENT DOCUMENTS

| 4,527,858 | 7/1985 | Takahasi et al. | 359/206 |
| 4,756,583 | 7/1988 | Morimoto | 359/207 |
| 5,270,851 | 12/1993 | Makino et al. | 359/206 |

FOREIGN PATENT DOCUMENTS

0613035  8/1994  European Pat. Off. .
63-313114 12/1988 Japan .
3-65917  3/1991  Japan .

Primary Examiner—Paul M. Dzierzynski
Assistant Examiner—Darren E. Schuberg
Attorney, Agent, or Firm—Greenblum & Bernstein P.L.C.

[57] ABSTRACT

A scanning (fθ) lens includes first, second, third, and fourth lenses, respectively having negative, positive, positive, and negative power in at least the main scanning directions. The lenses are arranged in order from a polygon mirror to a drawing surface. The Abbe number of the fourth lens is less than 40. In a further refinement, the Abbe number of the fourth lens subtracted from half the difference between the Abbe numbers of the second and third lenses is greater than 20. In another refinement, the scanned surface side surface of the first lens element is a cylindrical surface having negative power only in the auxiliary scanning direction, and the scanned surface side surface of one of the second or third lens elements is a toric surface having greater positive power in the auxiliary scanning direction than in the main scanning direction.

7 Claims, 8 Drawing Sheets

SCANNING LENS

BACKGROUND OF THE INVENTION

The present invention relates to a scanning lens used in the scanning optical system of a printing unit of a laser printer, facsimile machine, or the like.

In a conventional laser printer, output from a laser light source is guided via an optical system to a deflector, such as a rotating or oscillating mirror, and is scanned across a photoconductive drum by the deflector. The photoconductive drum is thereby exposed line by line, and an electrostatic latent image (to be transferred to a recording sheet) is formed on the photoconductive drum.

In the majority of cases, a single light source, usually a single semiconductor layer, is used to provide the scanning beam along a single scanning line. In conventional scanning optical systems designed for this kind of single stable-wavelength light source, longitudinal and lateral chromatic aberration are not taken into consideration.

However, where more than one semiconductor laser is used in a multibeam layout to form several scanning lines, minor variations in the wavelength of the emitted beams are usually found between the lasers. Furthermore, the wavelength of a light source or light sources can be affected by environmental factors.

With conventional scanning optical systems, when wavelength variations exists between the light sources, lateral chromatic aberration causes the lengths of the scanning lines to differ between each light source, and the drawing precision is thereby lowered.

SUMMARY OF THE INVENTION

It is therefore an object of the present invention to provide an improved scanning lens capable of compensating for lateral chromatic aberrations even in the presence of variability in the wavelength of the light source.

The present invention relates to a scanning lens that satisfies this need. According to one aspect of the present invention, a scanning lens for forming an image of a beam scanned by a deflector onto a scanned surface includes: a first lens element having a negative power in at least a main scanning direction; a second lens element having a positive power in at least the main scanning direction; a third lens element having a positive power in at least the main scanning direction; and a fourth lens element. The first through fourth lens elements are arrange din order, from the deflector towards the scanned surface, and each of the lens elements is closer to the deflector than to the scanned surface. The fourth lens element has a negative power at least in a main scanning direction, and satisfies a condition $v_4 < 40$, where $v_4$ is the Abbe number of the fourth lens element.

By satisfying the condition $v_4 < 40$, the fourth lens element of the scanning lens (the scanning lens having a positive power as a whole) has a large dispersion that causes a lateral chromatic aberration that is opposite in direction to that caused by the first through third lens elements. The occurrence of lateral chromatic aberration for the entire lens system is thereby suppressed.

In a further refinement of this aspect of the invention, the second lens element, the third lens element, and the fourth lens element satisfy a condition $((v_2+v_3)/2)-v_4 > 20$, where $v_2$ is the Abbe number of the second lens element, and $v_3$ is the Abbe number of the third lens element.

By satisfying the condition $((v_2+v_3)/2)-v_4 > 20$, the Abbe numbers $v_2$ and $v_3$ of the second and third lens elements and the Abbe number $v_4$ of the fourth lens element are balanced. Lateral chromatic aberration is thereby suppressed by forming one or more of the positive lens elements (second and third lenses) from a material having a lower dispersion than the material of the negative lens (fourth lens).

Lateral chromatic aberration causes the scanning width to become larger with longer wavelengths. If the above conditions $v_4 < 40$ and $((v_2+v_3)/2)-v_4 > 20$ are not satisfied, the variation in the scanning width caused by the variation in wavelength is excessive, and the drawing performance is lowered.

In one particular embodiment of this aspect of the invention, the scanned surface side surface of the first lens element has a cylindrical surface having a negative power only in an auxiliary scanning direction, and the scanned surface side surface of the second lens element has a toric surface having a greater positive power in the auxiliary scanning direction than in the main scanning direction.

In an alternative embodiment of this aspect of the invention, the scanned surface side surface of the first lens element has a cylindrical surface having a negative power only in the auxiliary scanning direction, and wherein the scanned surface side surface of the third lens element has a toric surface having a greater positive power in the auxiliary scanning direction than in the main scanning direction.

These arrangements of cylindrical and toric surfaces suppress astigmatism in the system.

According to another aspect of the invention, a scanning lens for forming an image of a beam scanned by a deflector onto a scanned surface includes: a first lens element having a negative power in at least a main scanning direction; a second lens element having a positive power in at least the main scanning direction; a third lens element having a positive power in at least the main scanning direction; and a fourth lens element. The first through fourth lens elements are arrange din order from the deflector towards the scanned surface, and each of the lens elements is closer to the deflector than to the scanned surface. The second lens element, the third lens element, and the fourth lens element satisfy a condition $((v_2+v_3)/2)-v_4 > 20$, where $v_2$ is the Abbe number of the second lens element, $v_3$ is the Abbe number of the third lens element, and $v_4$ is the Abbe number of the fourth lens element.

By satisfying the condition $((v_2+v_3)/2)-v_4 > 20$, the Abbe numbers $v_2$ and $v_3$ of the second and third lens elements and the Abbe number $v_4$ of the fourth lens element are balanced. Lateral chromatic aberration is thereby suppressed by forming one or more of the positive lens elements (second and third lenses) from a material having a lower dispersion than the material of the negative lens (fourth lens).

DETAILED DESCRIPTION OF THE PREFERRED EMBODIMENTS

Figure 1A:
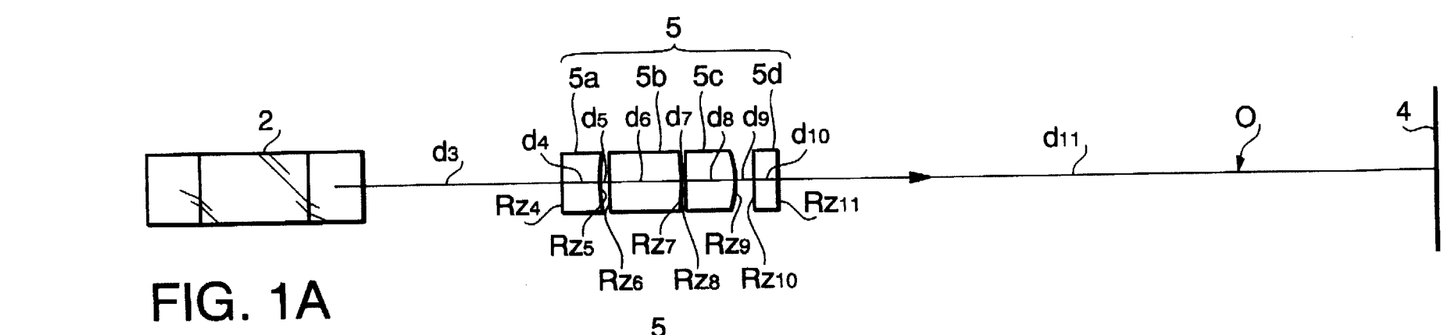
FIG. 1A is a side view lens configuration showing the auxiliary scanning direction of the primary parts of a scanning optical system to which a first embodiment of a scanning lens according to the invention is applied.
Figure 1B:
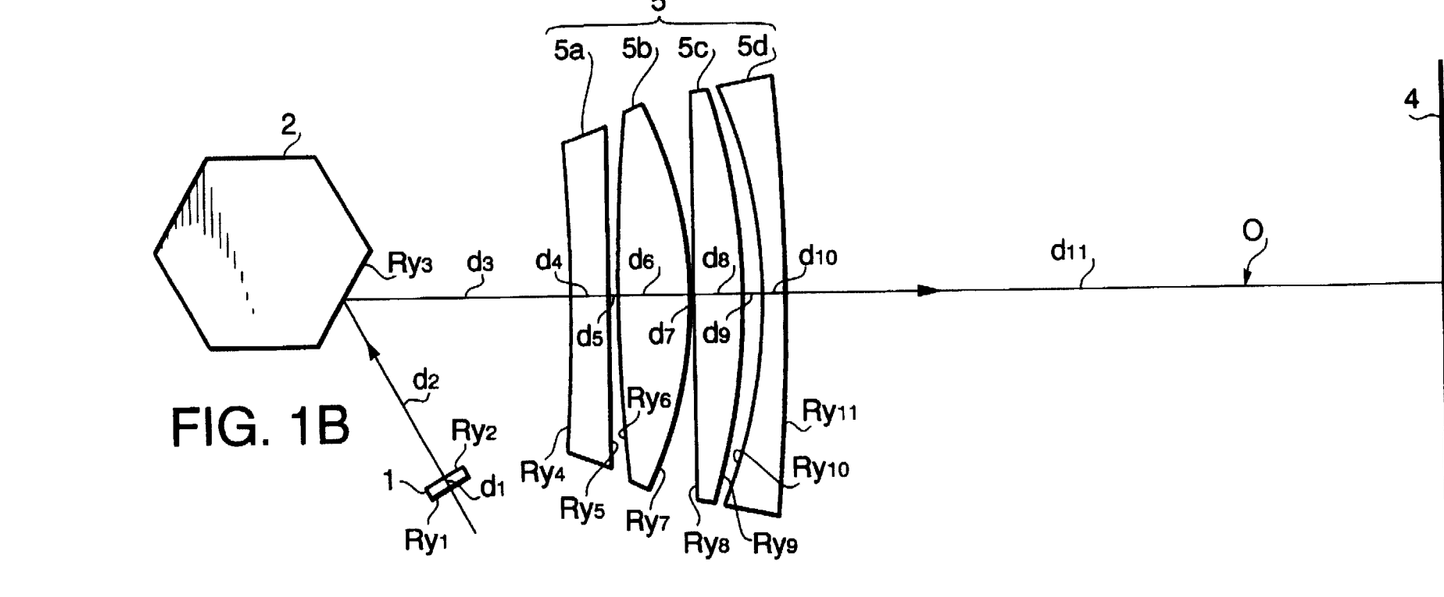
FIG. 1B is a top view lens configuration showing the main scanning direction of the primary parts of a scanning optical system to which the first embodiment of a scanning lens according to the invention is applied.

FIG. 1A is a side view lens configuration showing a auxiliary scanning direction, and FIG. 1B is a top view lens configuration showing a main scanning direction, of the primary parts of a scanning optical system to which a first embodiment of a scanning lens according to the invention is applied.

As shown in FIG. 1, a first example of a scanning lens 5 according to the invention is employed as the image forming optical system of a scanning optical system of a laser printer (not shown).

A laser beam is emitted from a single beam (or preferably, a plurality of beams are emitted) from a light source (not shown) such as a semiconductor layer (or lasers). The laser beam is collimated by a collimating lens (not shown), is converged only in the auxiliary scanning direction by a cylindrical lens 1, and impinges upon on a rotating polygonal mirror 2. The beam is scanned (i.e., deflected) by the rotating polygon mirror 2, and the scanning beam is imaged via the scanning lens 5 (an fθ lens) onto the (scanned) drawing surface 4.

The cylindrical lens 1 has power in the auxiliary scanning direction only, for converging the beam to form a line image near the mirror surfaces of the polygonal mirror 2. The scanning (fθ) lens 5 images the scanning beam from the polygonal mirror 2 on the image plane (drawing surface 4). The mirror surfaces of the polygonal mirror 2 and the drawing surface 4 (the image plane) are in substantially optically conjugate positions in the auxiliary scanning direction, and displacements of the scanning lines caused by tilting errors of the polygonal mirror 2 are reduced thereby.

In each of the embodiments, as shown in FIGS. 1A, 1B, 3A, 3B, 5A, 5B, 7A, and 7B, the scanning (fθ) lens 5 includes a first lens element 5a, a second lens element 5b, a third lens element 5c, and a fourth lens element 5d, in that order form the polygonal mirror 2 side. The lens elements 5a, 5b, 5c, and 5d have negative, positive, positive, and negative power, respectively, in both the main scanning and auxiliary scanning directions.

The first lens element 5a is a negative lens having a spherical surface with negative power on the polygon mirror 2 side, and a cylindrical surface with negative power only in the auxiliary scanning direction on the drawing surface 4 side. The first lens element 5a, as a whole, has a relatively weak negative power in the main scanning direction, and a relatively strong negative power in the auxiliary scanning direction.

Both the second lens element 5b and the third lens element 5c have positive power in both the main scanning and auxiliary scanning direction. The surfaces of the second lens element 5b and third lens element 5c differ between embodiments, and are described below.

The fourth lens element 5d has a rotationally symmetric surface (in the present embodiments, a spherical surface) on both sides. The fourth lens element 5d is a negative meniscus lens with the polygonal mirror 2 side surface having strong negative power, and the drawing surface 4 side surface having weak positive power.

The four embodiments are each specific numerical configurations of the scanning lens 5 described above.

FIGS. 1A and 1B show the first embodiment of a scanning (fθ) lens 5 according to the invention, and the specific numerical lens parameters of the first embodiment are shown in Table 1.

In the first embodiment, both side surfaces of the second lens element 5b are spherical surfaces having positive power. The polygonal mirror 2 side surface of the third lens element 5c is a plane surface, and the drawing surface 4 side of the third lens element 5c is a toric surface with relatively weak positive power in the main scanning direction and relatively strong positive power in the auxiliary scanning direction.

In Table 1, "SURFACE" is the ordinal number of the surface of the scanning optical system in order from the cylindrical lens 1, "Ry" is the radius of curvature in the main scanning direction, and "Rz" is the radius of curvature in the auxiliary scanning direction. "d" is the distance between surfaces along the optical axis, both internal to the optical elements and between, and corresponding to distances designated in FIG. 1 by $d_i$, where i is the ordinal number, in order from the cylindrical lens 1, of the distances. "n" is the refractive index of a particular lens element, aligned in Table 1 with the first surface of the corresponding lens element, and ν is the Abbe number of a particular lens element, also aligned in Table 1 with the first surface of the corresponding lens element.

In Table 1, the first and second surfaces correspond to the surfaces of cylindrical lens 1, the third surface corresponds to the mirror surfaces of polygonal mirror 2, the fourth and fifth surfaces correspond to the surfaces of first lens element 5a of the scanning (fθ) lens 5, the sixth and seventh surfaces correspond to the surfaces of second lens element 5b, the eighth and ninth surfaces correspond to the surfaces of third lens element 5c, and the tenth and eleventh surfaces correspond to the surfaces of fourth lens element 5d. The focal length in the main scanning direction of the first embodiment of a scanning lens 5 is 300 mm.

TABLE 1

| SURFACE | Ry | Rz | d | n | ν |
| --- | --- | --- | --- | --- | --- |
| 1st | ∞ | 43.410 | 4.000 | 1.51633 | 64.1 |
| 2nd | ∞ | ∞ | 84.910 | | |
| 3rd | ∞ | ∞ | 95.000 | | |
| 4th | −578.370 | −578.370 | 15.335 | 1.62004 | 36.3 |
| 5th | ∞ | 71.395 | 4.000 | | |
| 6th | 1217.997 | 1217.997 | 30.000 | 1.62041 | 60.3 |
| 7th | −173.805 | −173.805 | 1.790 | | |
| 8th | ∞ | ∞ | 20.175 | 1.72916 | 54.7 |
| 9th | −269.029 | −51.338 | 8.670 | | |
| 10th | −212.560 | −212.560 | 10.000 | 1.76182 | 26.6 |
| 11th | −758.178 | −758.178 | 275.419 | | |

Figure 2A:
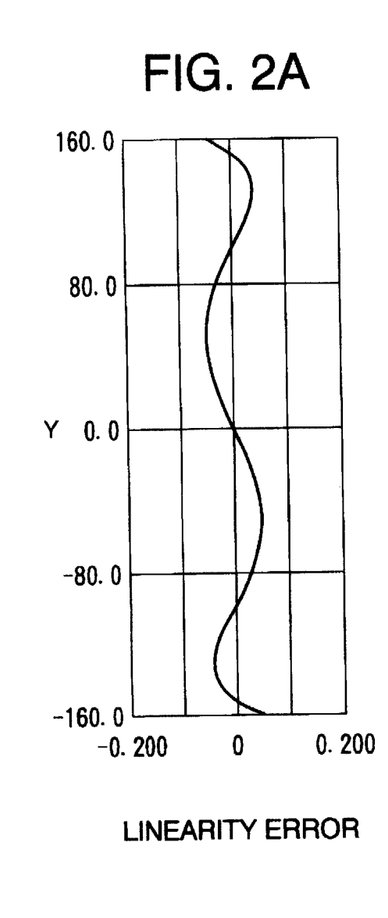
FIG. 2A is an aberration diagram of linearity error of the scanning optical system of the first embodiment.
Figure 2B:
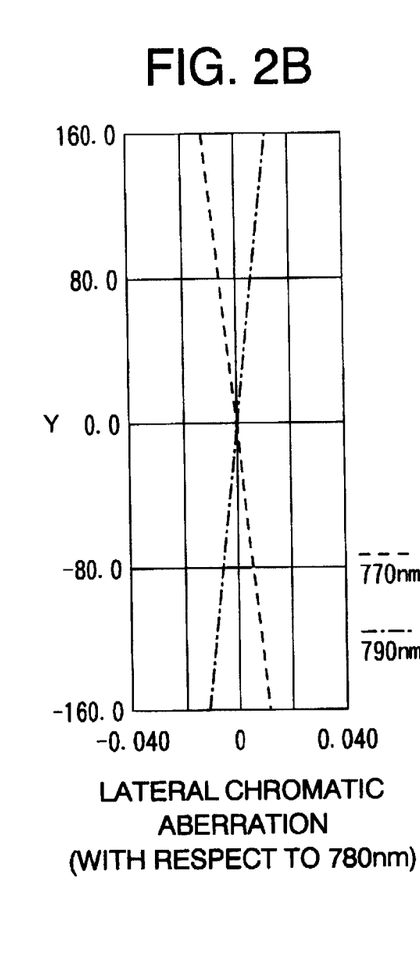
FIG. 2B is an aberration diagram of lateral chromatic aberration of the scanning optical system of the first embodiment.
Figure 2C:
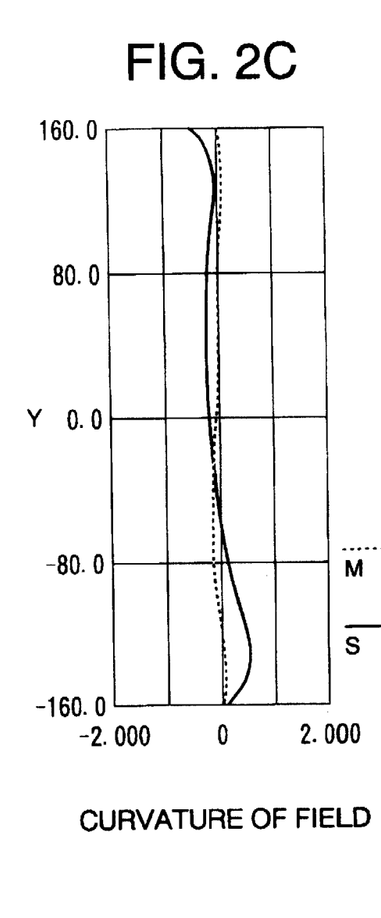
FIG. 2C is an aberration diagram of curvature of field of the scanning optical system of the first embodiment.

FIG. 2A is an aberration diagram of linearity error of the scanning optical system (as a whole) of the first embodiment; FIG. 2B is an aberration diagram of lateral chromatic aberration of the scanning optical system of the first embodiment; and FIG. 2C is an aberration diagram of curvature of field (M: meridional: main scanning direction, S: sagittal: auxiliary scanning direction) of the scanning optical system of the first embodiment. In FIG. 2B, the lateral chromatic aberration is shown as differences of the linearity errors of 770 nm and 790 nm wavelength light from the linearity error of 780 nm wavelength light. In each of FIGS. 2A, 2B, and 2C, the ordinate indicates the image height Y in mm, and the abscissa indicates the amount of aberration in mm.

Figure 3A:
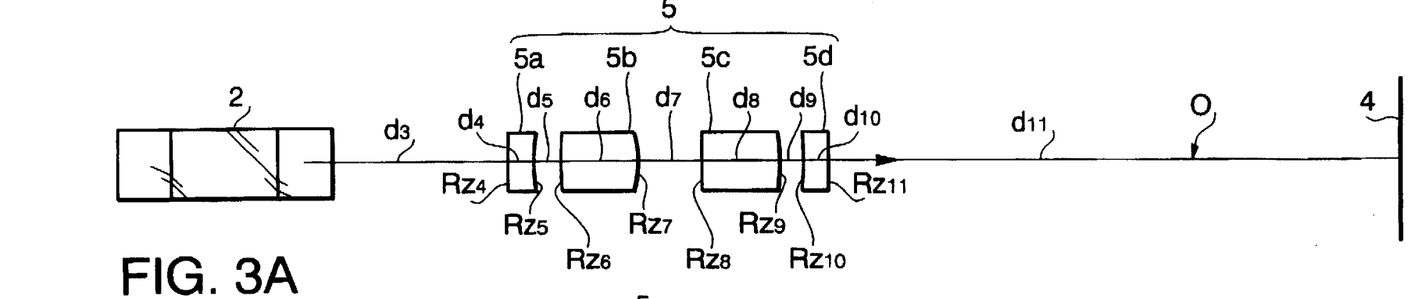
FIG. 3A is a side view lens configuration showing the auxiliary scanning direction of the primary parts of a scanning optical system to which a second embodiment of a scanning lens according to the invention is applied.
Figure 3B:
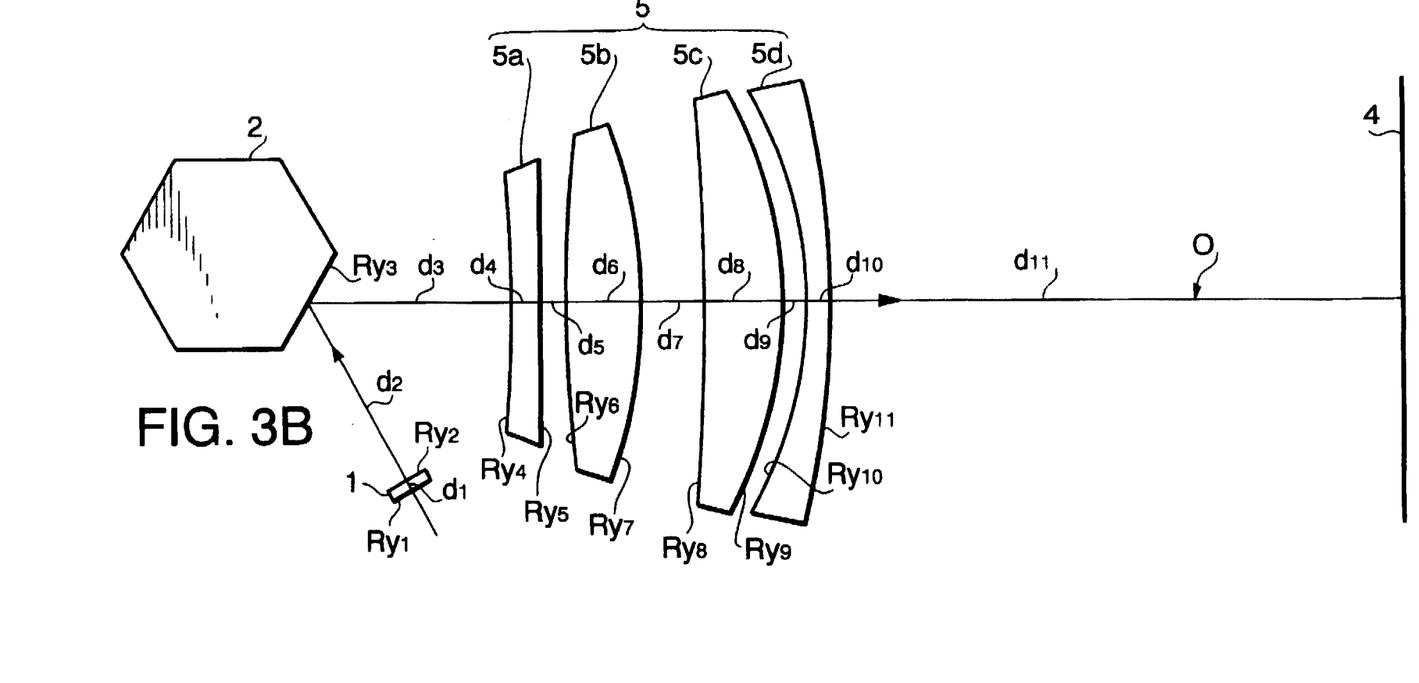
FIG. 3B is a top view lens configuration showing the main scanning direction of the primary parts of a scanning optical system to which the second embodiment of a scanning lens according to the invention is applied.

FIGS. 3A and 3B show the second embodiment of a scanning (fθ) lens 5 according to the invention, and the specific numerical lens parameters of the second embodiment are shown in Table 2.

In the second embodiment, the polygonal mirror 2 side surface of the second lens element 5b is a spherical surface having positive power, and the drawing surface 4 side surface of the second lens element 5b is a toric surface with relatively weak positive power in the main scanning direction and relatively strong positive power in the auxiliary scanning direction. The polygonal mirror 2 side surface of the third lens element 5c is a spherical surface having negative power, and the drawing surface 4 side surface is a spherical surface having positive power.

In Table 2, the headings and categories are the same as described for Table 1, and the first and second surfaces correspond to the surfaces of cylindrical lens 1, the third surface corresponds to the mirror surfaces of polygonal mirror 2, the fourth and fifth surfaces correspond to the surfaces of first lens element 5a of the scanning (fθ) lens 5, the sixth and seventh surfaces correspond to the surfaces of second lens element 5b, the eighth and ninth surfaces correspond to the surfaces of third lens element 5c, and the tenth and eleventh surfaces correspond to the surfaces of fourth lens element 5d. The focal length in the main scanning direction of the second embodiment of a scanning lens 5 is 330 mm.

TABLE 2

| SURFACE | Ry | Rz | d | n | ν |
| --- | --- | --- | --- | --- | --- |
| 1st | ∞ | 43.410 | 4.000 | 1.51633 | 64.1 |
| 2nd | ∞ | ∞ | 84.910 | | |
| 3rd | ∞ | ∞ | 86.092 | | |
| 4th | −492.986 | −492.986 | 12.000 | 1.64769 | 33.8 |
| 5th | ∞ | 93.437 | 11.655 | | |
| 6th | 931.218 | 931.218 | 31.146 | 1.69680 | 55.5 |
| 7th | −211.607 | −49.255 | 27.789 | | |
| 8th | −798.650 | −798.650 | 31.318 | 1.61800 | 63.4 |
| 9th | −175.702 | −175.702 | 10.000 | | |
| 10th | −163.479 | −163.479 | 10.000 | 1.84666 | 23.8 |
| 11th | −336.553 | −336.553 | 282.372 | | |

Figure 4A:
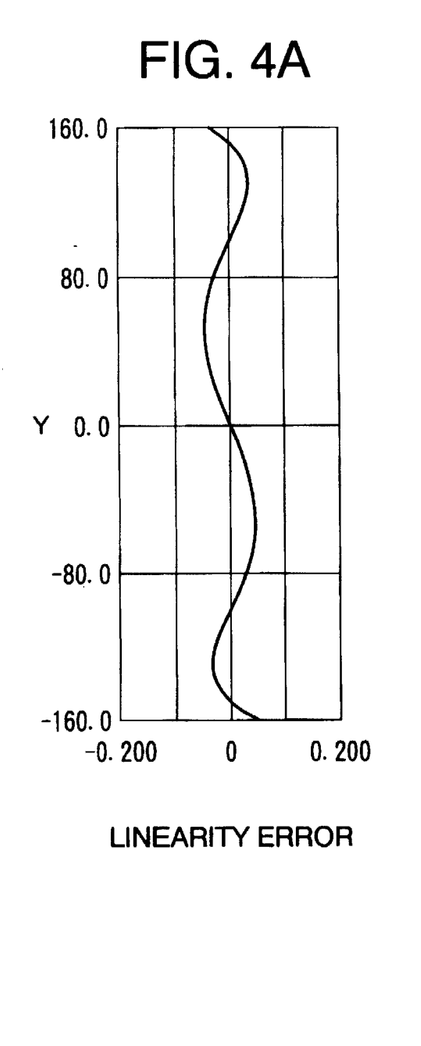
FIG. 4A is an aberration diagram of linearity error of the scanning optical system of the second embodiment.
Figure 4B:
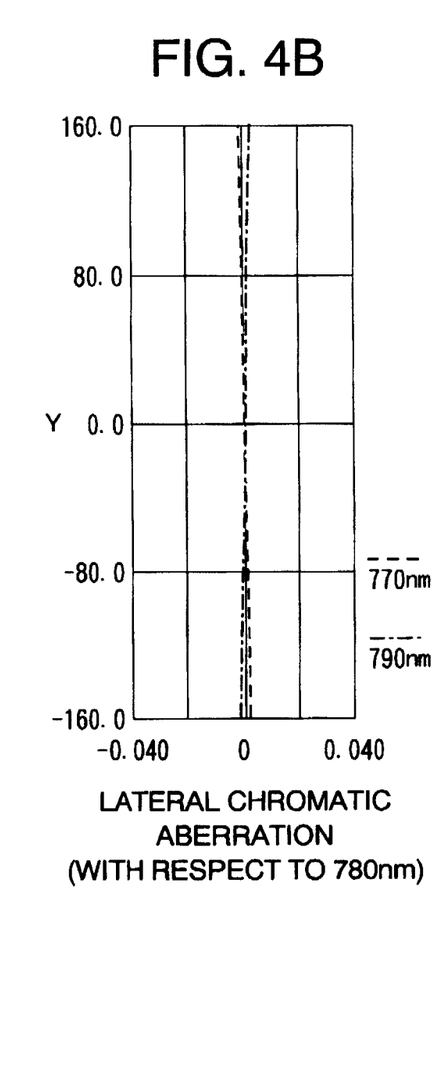
FIG. 4B is an aberration diagram of lateral chromatic aberration of the scanning optical system of the second embodiment.
Figure 4C:
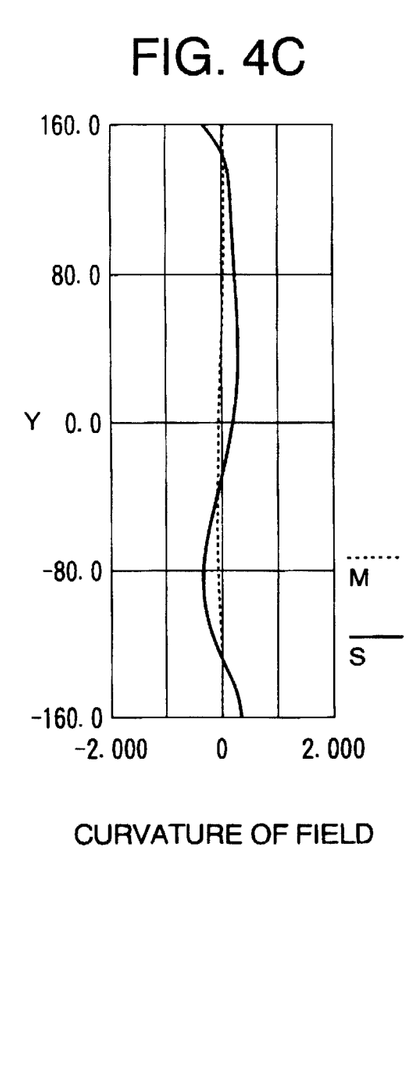
FIG. 4C is an aberration diagram of curvature of field of the scanning optical system of the second embodiment.

FIG. 4A is an aberration diagram of linearity error of the scanning optical system (as a whole) of the second embodiment; FIG. 4B is an aberration diagram of lateral chromatic aberration of the scanning optical system of the second embodiment; and FIG. 4C is an aberration diagram of curvature of field (M: meridional: main scanning direction, S: sagittal: auxiliary scanning direction) of the scanning optical system of the second embodiment. In FIG. 4B, the lateral chromatic aberration is shown as differences of the linearity errors of 770 nm and 790 nm wavelength light from the linearity error of 780 nm wavelength light. In each of FIGS. 4A, 4B, and 4C, the ordinate indicates the image height Y in mm, and the abscissa indicates the amount of aberration in mm.

Figure 5A:
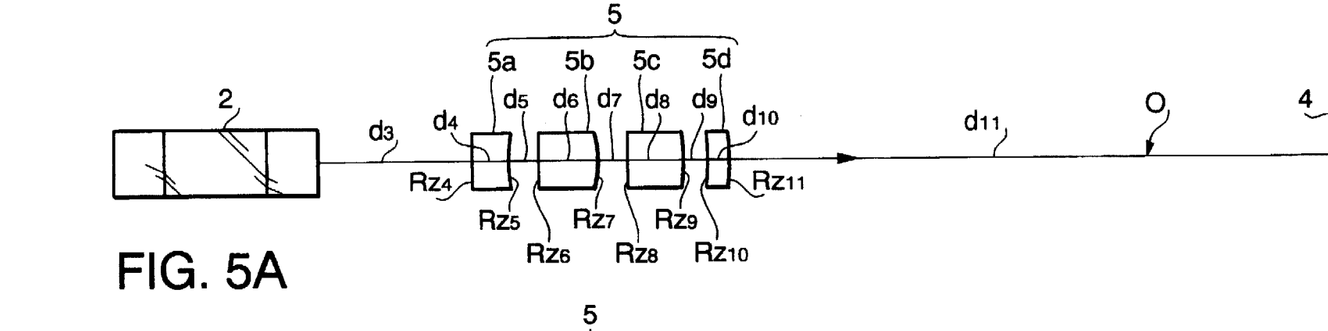
FIG. 5A is a side view lens configuration showing the auxiliary scanning direction of the primary parts of a scanning optical system to which a third embodiment of a scanning lens according to the invention is applied.
Figure 5B:
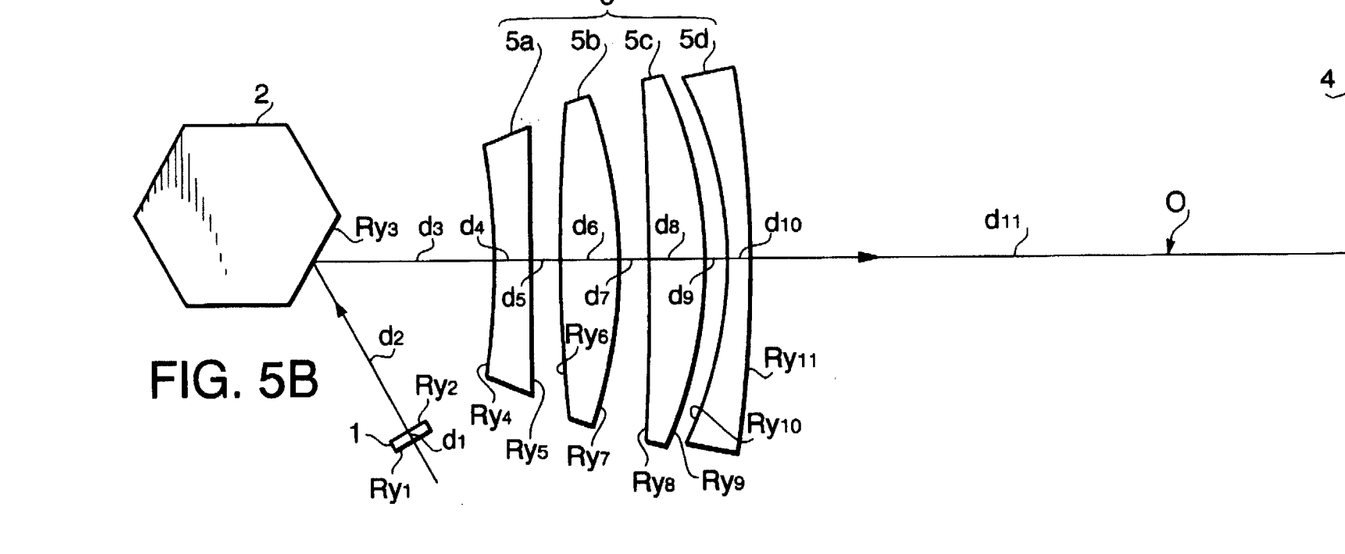
FIG. 5B is a top view lens configuration showing the main scanning direction of the primary parts of a scanning optical system to which the third embodiment of a scanning lens according to the invention is applied.

FIGS. 5A and 5B show the third embodiment of a scanning (fθ) lens 5 according to the invention, and the specific numerical lens parameters of the third embodiment are shown in Table 3.

In the third embodiment, the polygonal mirror 2 side surface of the second lens element 5b is a spherical surface having a positive power, and the drawing surface 4 side surface of the second lens element 5b is a toric surface with relatively weak positive power in the main scanning direction and relatively strong positive power in the auxiliary scanning direction. The polygonal mirror 2 side surface of the third lens element 5c is a spherical surface having negative power, and the drawing surface 4 side surface is a spherical surface having positive power.

In Table 3, the headings and categories are the same as described for Tables 1 and 2. The first and second surfaces correspond to the surfaces of cylindrical lens 1, the third surface corresponds to the mirror surfaces of polygonal mirror 2, the fourth and fifth surfaces correspond to the surfaces of first lens element 5a of the scanning (fθ) lens 5, the sixth and seventh surfaces correspond to the surfaces of second lens element 5b, the eight and ninth surfaces correspond to the surfaces of third lens element 5c, and the tenth and eleventh surfaces correspond to the surfaces of fourth lens element 5d. The focal length in the main scanning direction of the third embodiment of a scanning lens 5 is 330 mm.

TABLE 3

| SURFACE | Ry | Rz | d | n | ν |
| --- | --- | --- | --- | --- | --- |
| 1st | ∞ | 43.410 | 4.000 | 1.51633 | 64.1 |
| 2nd | ∞ | ∞ | 84.910 | | |
| 3rd | ∞ | ∞ | 80.788 | | |
| 4th | −346.878 | −346.878 | 16.514 | 1.62004 | 36.3 |
| 5th | ∞ | 92.527 | 12.954 | | |
| 6th | 1245.753 | 1245.753 | 25.133 | 1.78650 | 50.0 |

TABLE 3-continued

| SURFACE | Ry | Rz | d | n | v |
|---|---|---|---|---|---|
| 7th | −205.744 | −53.310 | 13.507 | | |
| 8th | −1402.190 | −1402.190 | 25.000 | 1.72000 | 50.2 |
| 9th | −180.603 | −180.603 | 10.160 | | |
| 10th | −165.376 | −165.376 | 10.000 | 1.84666 | 23.8 |
| 11th | −539.141 | −539.141 | 300.214 | | |

Figure 6A:
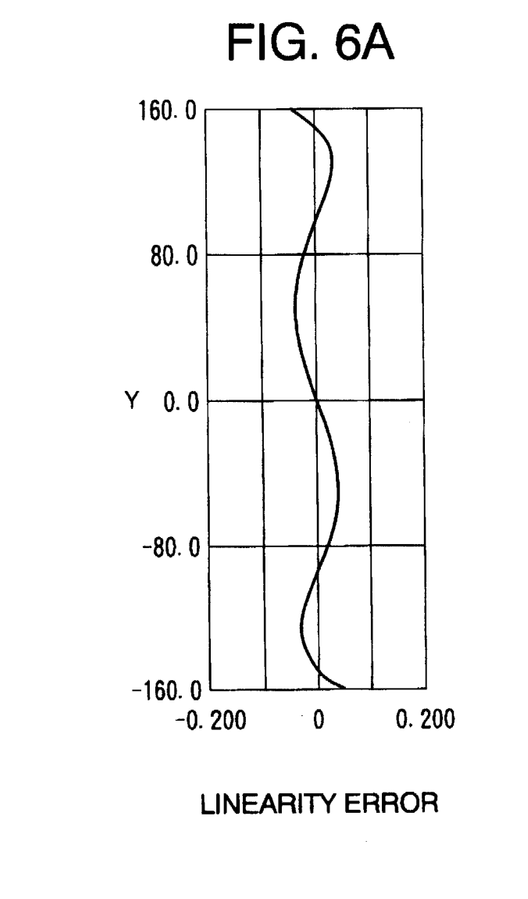
FIG. 6A is an aberration diagram of linearity error of the scanning optical system of the third embodiment.
Figure 6B:
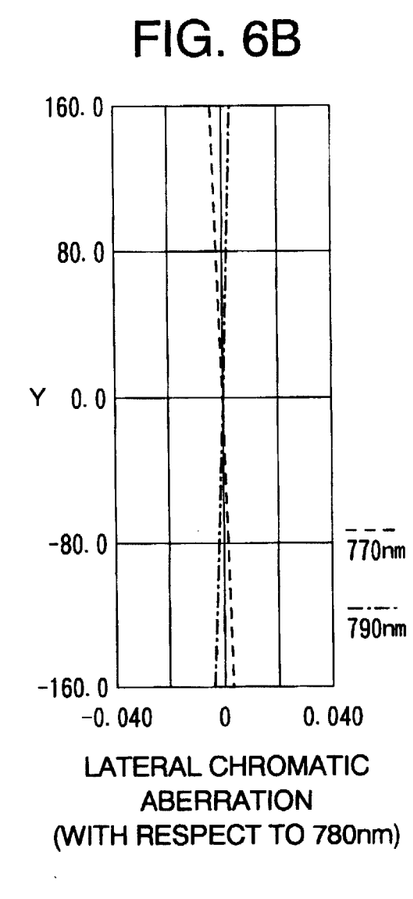
FIG. 6B is an aberration diagram of lateral chromatic aberration of the scanning optical system of the third embodiment.
Figure 6C:
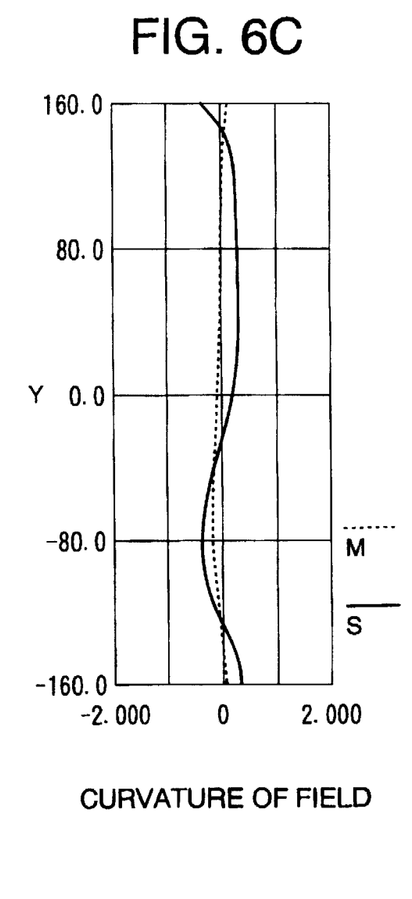
FIG. 6C is an aberration diagram of curvature of field of the scanning optical system of the third embodiment.

FIG. 6A is an aberration diagram of linearity error of the scanning optical system (as a whole) of the third embodiment; FIG. 6B is an aberration diagram of lateral chromatic aberration of the scanning optical system of the third embodiment; and FIG. 6C is an aberration diagram of curvature of field (M: meridional: main scanning direction, S: sagittal: auxiliary scanning direction) of the scanning optical system of the third embodiment. In FIG. 6B, the lateral chromatic aberration is shown as differences of the linearity errors of 770 nm and 790 nm wavelength light from the linearity error of 780 nm wavelength light. In each of FIGS. 6A, 6B, and 6C, the ordinate indicates the image height Y in mm, and the abscissa indicates the amount of aberration in mm.

Figure 7A:
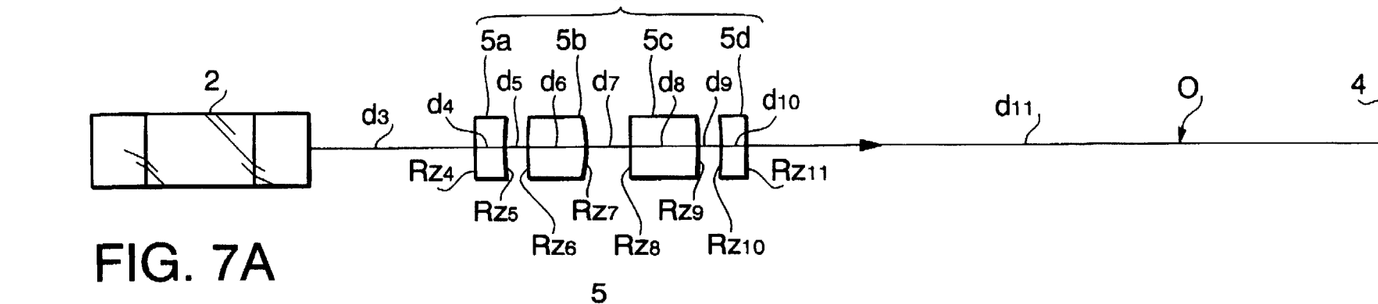
FIG. 7A is a side view lens configuration showing the auxiliary scanning direction of the primary parts of a scanning optical system to which a fourth embodiment of a scanning lens according to the invention is applied.
Figure 7B:
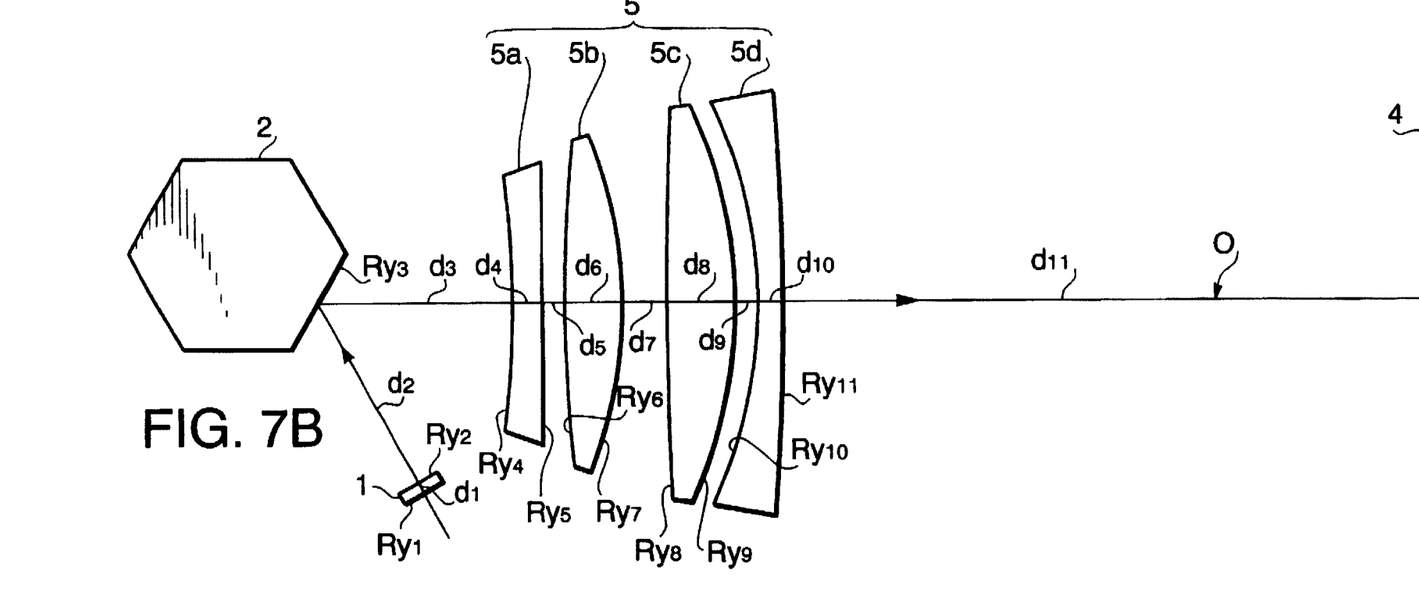
FIG. 7B is a top view lens configuration showing the main scanning direction of the primary parts of a scanning optical system to which the fourth embodiment of a scanning lens according to the invention is applied.

FIGS. 7A and 7B show the fourth embodiment of a scanning (fθ) lens 5 according to the invention, and the specific numerical lens parameters of the fourth embodiment are shown in Table 4.

In the fourth embodiment, the polygonal mirror 2 side surface of the second lens element 5b is a spherical surface having positive power, and the drawing surface 4 side surface of the second lens element 5b is a toric surface with relatively weak positive power in the main scanning direction and relatively strong positive power in the auxiliary scanning direction. The polygonal mirror 2 side surface of the third lens element 5c is a nearly flat spherical surface having very slight positive power, and the drawing surface 4 side surface is a spherical surface having positive power.

In Table 4, the headings and categories are the same as described in Tables 1 through 3. The first and second surfaces correspond to the surfaces of cylindrical lens 1, the third surface corresponds to the mirror surfaces of polygonal mirror 2, the fourth and fifth surfaces correspond to the surfaces of first lens element 5a of the scanning (fθ) lens 5, the sixth and seventh surfaces correspond to the surfaces of second lens element 5b, the eight and ninth surfaces correspond to the surfaces of third lens element 5c, and the tenth and eleventh surfaces correspond to the surfaces of fourth lens element 5d. The focal length in the main scanning direction of the third embodiment of a scanning lens 5 is 330 mm.

TABLE 4

| SURFACE | Ry | Rz | d | n | v |
|---|---|---|---|---|---|
| 1st | ∞ | 43.410 | 4.000 | 1.51633 | 64.1 |
| 2nd | ∞ | ∞ | 84.910 | | |
| 3rd | ∞ | ∞ | 82.648 | | |
| 4th | −326.287 | −326.287 | 12.000 | 1.64769 | 83.8 |
| 5th | ∞ | 144.299 | 10.517 | | |
| 6th | 1023.841 | 1023.841 | 23.715 | 1.61800 | 63.4 |
| 7th | −178.418 | −45.518 | 18.828 | | |
| 8th | 10776.166 | 10776.166 | 27.694 | 1.61800 | 63.4 |
| 9th | −180.501 | −180.501 | 10.000 | | |
| 10th | −162.378 | −162.378 | 10.000 | 1.59551 | 39.2 |
| 11th | −747.311 | −747.311 | 296.583 | | |

Figure 8A:
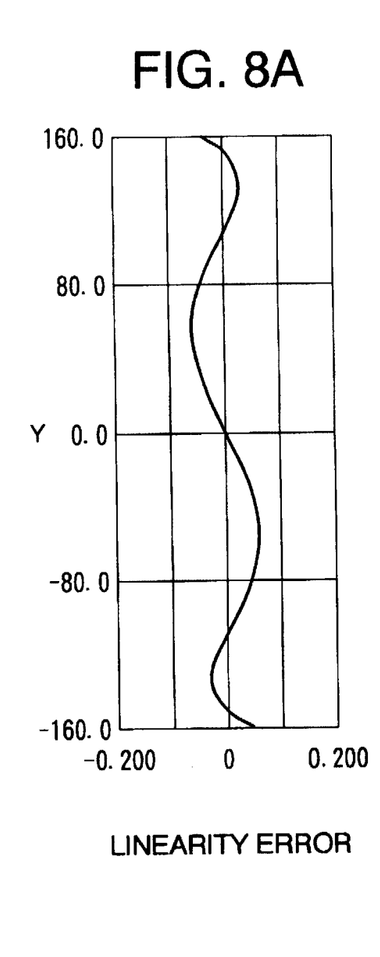
FIG. 8A is an aberration diagram of linearity error of the scanning optical system of the fourth embodiment.
Figure 8B:
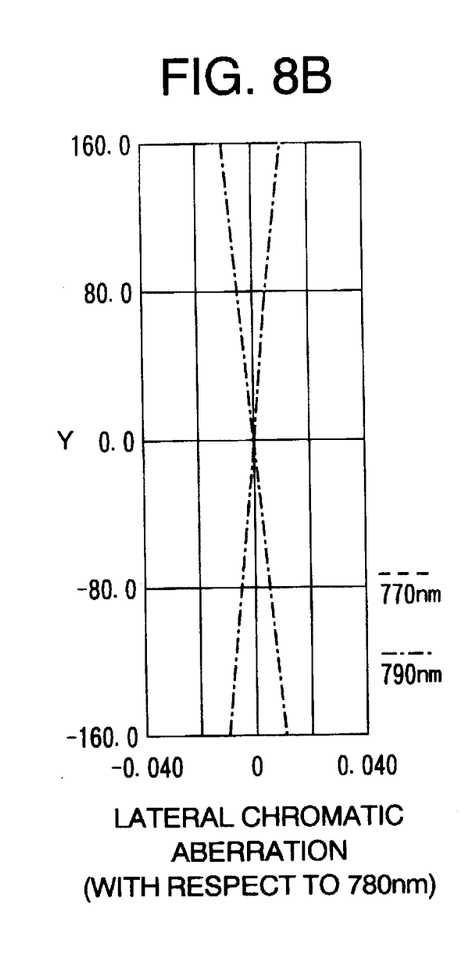
FIG. 8B is an aberration diagram of lateral chromatic aberration of the scanning optical system of the fourth embodiment.
Figure 8C:
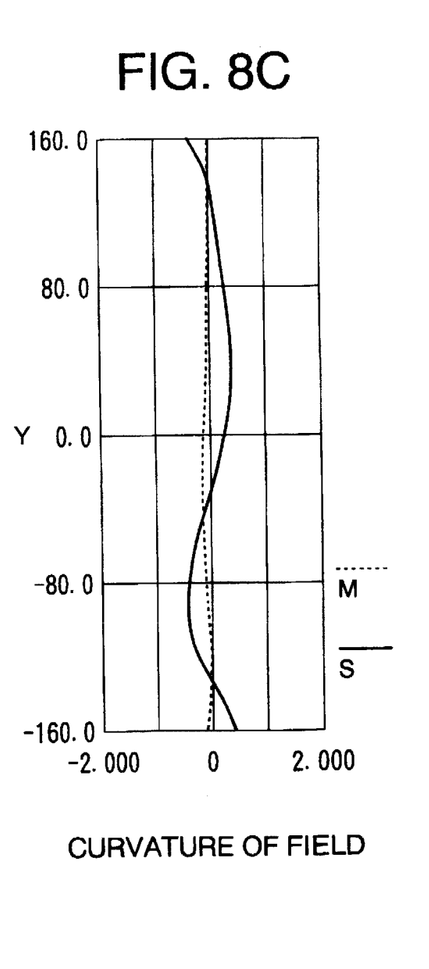
FIG. 8C is an aberration diagram of curvature of fourth of the scanning optical system of the fourth embodiment.

FIG. 8A is an aberration diagram of linearity error of the scanning optical system (as a whole) of the fourth embodiment; FIG. 8B is an aberration diagram of lateral chromatic aberration of the scanning optical system of the fourth embodiment; and FIG. 8C is an aberration diagram of curvature of field (M: meridional: main scanning direction, S: sagittal: auxiliary scanning direction) of the scanning optical system of the fourth embodiment. In FIG. 8B, the lateral chromatic aberration is shown as differences of the linearity error of 770 nm and 790 nm wavelength light from the linearity error of 780 nm wavelength light. In each of FIGS. 8A, 8B, and 8C, the ordinate indicates the image height Y in mm, and the abscissa indicates the amount of aberration in mm.

As can be understood from FIGS. 2A–2C, 4A–4C, 6A–6C, and 8A–8C, in each of the first through fourth embodiments, the scanning (fθ) lens 5 suppresses linearity error to a low level over a wide scanning range of ±160 mm. Furthermore, in each of the first through fourth embodiments, the scanning (fθ) lens 5 suppresses curvature of field in both the main scanning and auxiliary scanning directions to a low level over a wide scanning range of ±160 mm. The scanning range of ±160 mm is sufficient to span an A3 size manuscript.

The scanning (fθ) lens 5 in each of the first through fourth embodiments includes a plurality of lens elements disposed closer to the polygonal mirror 2 (deflector) than the scanned surface 4. The fourth lens element 5d, closest to the scanned surface 4, has a negative power at least in the main scanning direction. The Abbe number $v_4$ of the fourth lens element 5d satisfies a condition (1):

$$v_4 < 40 \qquad (1)$$

Preferably, as in the described embodiments, the scanning lens 5 consists of first, second, third, and fourth lens elements, respectively having a negative, a positive, positive, and a negative power in the main scanning direction, respectively, in order from the polygonal mirror 2 side. In this case, the Abbe numbers $v_i$ ($v_i$ being the Abbe number of the $i^{th}$ lens) of the lens elements preferably satisfy a condition (2):

$$\frac{v_2 + v_3}{2} - v_4 > 20. \qquad (2)$$

By satisfying condition (1), the fourth lens element 5d of the scanning lens 5 (the scanning lens having a positive power as a whole) is a negative lens having a large dispersion that causes a lateral chromatic aberration opposite in direction to that caused by the lens elements disposed on the polygonal mirror 2 (deflector) side of the fourth lens 5d. The occurrence of lateral chromatic aberration for the entire lens system is thereby suppressed.

By satisfying condition (2), the Abbe numbers $v_2$ and $v_3$ of the second and third lens elements 5b and 5c (having positive power in the main scanning direction) and the Abbe number $v_4$ of the fourth lens element 5d (having a negative power) are balanced. Lateral chromatic aberration is thereby suppressed by forming the positive lens from a material having a lower dispersion than the material for the negative lens.

Lateral chromatic aberration causes the scanning width to become larger with longer wavelengths. If the above conditions (1) and (2) are not satisfied, the variation in the scanning width caused by the variation in wavelength is excessive, and the drawing performance is lowered.

Furthermore, in order to suppress astigmatism, the scanned surface 4 side surface of the first lens element 5a is preferably a cylindrical surface having a negative power in only the auxiliary scanning direction, and the scanned surface 4 side surface of one of the second 5b or the third lens 5c (each having a positive power) is a toric surface having a greater positive power in the auxiliary scanning direction than in the main scanning direction.

The values of the abovementioned conditions (1) and (2) are shown for each of the above embodiments in Table 5.

TABLE 5

| CONDITION | EMBODIMENT | | | |
|---|---|---|---|---|
| | FIRST | SECOND | THIRD | FOURTH |
| (1) $v4$ | 26.6 | 23.8 | 23.8 | 39.2 |
| (2) $((v2 + v3)/2) - v4$ | 30.9 | 35.7 | 26.3 | 24.2 |

The advantage of the embodiments with respect to lateral chromatic aberration can be seen in each of FIGS. 2B, 4B, 6B, and 8B. For example, if a spot diameter of an imaged beam at the surface 4 is 38 μm, but there is a variation in wavelength of ±10 nm (with respect to a central wavelength of 780 nm) between beams, the chromatic aberration at the edges of the scanning range for the 20 nm width variation in wavelength is suppressed to approximately ½ the spot diameter in the case of the first and fourth embodiments, as shown in FIGS. 2B and 8B. For the same example, the chromatic aberration at the edges of the scanning range for the 20 nm width variation in wavelength is suppressed to approximately ⅓ the spot diameter in the case of the second and third embodiments, as shown in FIGS. 4B and 6B. Thus, even if variations in wavelength exist among the individual light sources in a multi-beam optical system, or even if the wavelength of a light source changes due to changes in environmental conditions, etc., the length of the scanning line is held constant and the drawing precision is maintained.

As described, the embodiments of a scanning lens according to the invention suppress the lateral chromatic aberration to a small level over a wide scanning width. Variations in the length of the scanning length due to variations in wavelength between light sources or environmentally influenced fluctuations in the wavelength of the light source are therefore suppressed and the drawing precision is improved.

The present disclosure relates to subject matter contained in Japanese Patent Application No. HEI 07-196000, filed on Jul. 7, 1995, which is expressly incorporated herein by reference in its entirety.

What is claimed is:

1. A scanning lens for forming an image of a beam scanned by a deflector onto a scanned surface, comprising:

a first lens element having a negative power in at least a main scanning direction;

a second lens element having a positive power in at least said main scanning direction;

a third lens element having a positive power in at least said main scanning direction; and a fourth lens element having a negative power in at least said main scanning direction, said first lens element, said second lens element, said third lens element, and said fourth lens element being arranged in order from the deflector towards the scanned surface, each of said lens elements being closer to said deflector than to said scanned surface, wherein said fourth lens element satisfies a condition:

$v_4 < 40$, wherein $v_4$ is an Abbe number of said fourth lens element.

2. The scanning lens according to claim 1, wherein said second lens element, said third lens element, and said fourth lens element satisfy a condition:

$((v_2+v_3)/2)-v_4 > 20$, where $v_2$ is an Abbe number of said second lens element, and $v_3$ is an Abbe number of said third lens element.

3. The scanning lens according to claim 1, wherein a scanned surface side surface of said first lens element comprises a cylindrical surface having a negative power only in an auxiliary scanning direction, and wherein a scanned surface side surface of said second lens element comprises a toric surface having a positive power greater in said auxiliary scanning direction than in said main scanning direction.

4. The scanning lens according to claim 1, wherein said scanned surface side surface of said first lens element comprises a cylindrical surface having a negative power only in said auxiliary scanning direction, and wherein a scanned surface side surface of said third lens element comprises a toric surface having a positive power greater in said auxiliary scanning direction than in said main scanning direction.

5. A scanning lens for forming an image of a beam scanned by a deflector onto a scanned surface, comprising:

a first lens element having a negative power in at least a main scanning direction;

a second lens element having a positive power in at least said main scanning direction;

a third lens element having a positive power in at least said main scanning direction; and a fourth lens element having a negative power in at least said main scanning direction, said first lens element, said second lens element, said third lens element, and said fourth lens element being arranged in order from the deflector towards the scanned surface, each of said lens elements being closer to said deflector than to said scanned surface, wherein said second lens element, said third lens element, and said fourth lens element satisfy a condition:

$((v_2+v_3)/2)-v_4 > 20$, where $v_2$ is an Abbe number of said second lens element, $v_3$ is an Abbe number of said third lens element, and $v_4$ is an Abbe number of said fourth lens element.

6. The scanning lens according to claim 5, wherein a scanned surface side surface of said first lens element comprises a cylindrical surface having a negative power only in an auxiliary scanning direction, and wherein a scanned surface side surface of said second lens element comprises a toric surface having a positive power greater in the auxiliary scanning direction than in the main scanning direction.

7. The scanning lens according to claim 5, wherein a scanned surface side surface of said first lens element comprises a cylindrical surface having a negative power only in the auxiliary scanning direction, and wherein a scanned surface side surface of said third lens element comprises a toric surface having a positive power greater in the auxiliary scanning direction than in the main scanning direction.

* * * * *